(12) United States Patent
Anbananthan et al.

(10) Patent No.: US 8,615,163 B2
(45) Date of Patent: Dec. 24, 2013

(54) FRAMEWORK, SYSTEM AND METHOD FOR RAPID DEPLOYMENT OF INTERACTIVE APPLICATIONS

(75) Inventors: Saravana Prabhu Anbananthan, Los Angeles, CA (US); Steven Lawson, Playa del Rey, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 295 days.

(21) Appl. No.: 12/838,563

(22) Filed: Jul. 19, 2010

(65) Prior Publication Data
US 2011/0135280 A1 Jun. 9, 2011

Related U.S. Application Data

(60) Provisional application No. 61/285,058, filed on Dec. 9, 2009.

(51) Int. Cl.
*H04N 5/761* (2006.01)
(52) U.S. Cl.
USPC .......................................... 386/282; 386/278
(58) Field of Classification Search
None
See application file for complete search history.

(56) References Cited

U.S. PATENT DOCUMENTS

| 2002/0112226 A1* | 8/2002 | Brodersen et al. ............ 717/140 |
| 2004/0039468 A1 | 2/2004 | Zahorack et al. |
| 2005/0033763 A1 | 2/2005 | Chen et al. |
| 2005/0132336 A1 | 6/2005 | Gotwals et al. |
| 2005/0202385 A1 | 9/2005 | Coward et al. |
| 2005/0246745 A1* | 11/2005 | Hirsch et al. .................... 725/74 |
| 2006/0041890 A1 | 2/2006 | Pik et al. |
| 2007/0009239 A1* | 1/2007 | Seo et al. ....................... 386/126 |
| 2007/0192353 A1* | 8/2007 | Wang et al. .................... 707/102 |
| 2007/0256073 A1 | 11/2007 | Troung et al. |
| 2008/0102428 A1 | 5/2008 | Levy et al. |
| 2010/0049335 A1 | 2/2010 | Assarsson et al. |
| 2010/0313200 A1* | 12/2010 | Rozee et al. .................... 718/1 |
| 2011/0016347 A1* | 1/2011 | Brodeur et al. .................. 714/2 |
| 2012/0030692 A1 | 2/2012 | Chen et al. |

FOREIGN PATENT DOCUMENTS

WO 2008127573 A1 10/2008

OTHER PUBLICATIONS

Glass Houses: Author! Author! Challenges of Blu-ray Disc and BD-Live Title Creation. http://www.emedialive.com/Articles/ReadArticle.aspx?ArticleID=13855. Jul. 8, 2008.

* cited by examiner

*Primary Examiner* — Huy T Nguyen
*Assistant Examiner* — Eileen Adams
(74) *Attorney, Agent, or Firm* — Mayer & Williams PC; Mark D. Wieczorek

(57) ABSTRACT

Systems and methods are disclosed that provide a framework, e.g., a Java®-based toolkit, that provides various levels of abstraction according to the needs of the designer. The abstraction levels are each associated with a set of packages that provide functionality suitable to the level. A user or designer accesses the level packages within the framework and employs the same to create a desired computer-readable media, e.g., a Blu-ray® disc or "BD". Other aspects may provide corresponding or complementary functionality. For example, the framework abstracts drawing or graphics primitives to higher-level entities, allowing the same to be easily employed in the creation of arbitrary graphical elements. In another example, a business logic module may be employed which can be customized by using settings files.

21 Claims, 15 Drawing Sheets

Fig. 9(A) - Exemplary Package List

Default package:

This provides an entry point to the program, and contains anything specific to the project.

BDLive:

This contains BDLive classes, and includes both UI elements (MenuProfile.java) and tools and utilities (DownloadQueue) in addition to other elements, e.g., ringtones, videos, or the like (e.g., mini-applications created in XML, etc.).

Com.bdlive.app.Photoalbum:

This uses elements of the BDLive package, but aside from the menu UI display is a buffering slideshow implementation that serves up images on request and is automated.

Com.bdlive.app.pyim:

This is an application for making a user appear to be portrayed in a movie, and includes mostly display classes. Online functionality (and lower level abstractions) are provided in the BDLiveClient.

Com.bdlive.app.survey:

This includes display classes and settings for the survey functionality, and utilizes the BDLive package.

Com.bdlive.app.survey.metadata:

This contains certain dependent classes for the survey.

Fig. 9(B) - Exemplary Package List

Com.company.studio.bdj:

This is the root package for BD-J, and contains debug classes, media trackers, and the root BDJApp itself.

Com.company.studio.bdj.animation:

This contains classes for animating widgets.

Com.company.studio.bdj.event:

This contains event listeners for keys and buttons.

Com.company.studio.bdj.media:

This contains media controllers of various types, as well as items for showing widgets on screen according to time codes.

Com.company.studio.bdj.media.dom:

This includes classes for parsing XML metadata to create different media events.

Com.company.studio.bdj.media.metadata:

This includes media metadata abstractions, playlists and titles.

Fig. 9(C) - Exemplary Package List

Com.company.studio.bdj.net:

These are the fundamental net classes, containing httpclient, session info and document parsers. The httpClient contains most fundamental actions and is used by the BDLiveClient.

Com.company.studio.bdj.protocol:

These are more specific cases of client behavior, in particular the core BDLiveClient. This also contains salt info, as well as metadata for a large number of various net functions such as those used by PYIM, the photo album, and so on.

Com.company.studio.bdj.parser:

This contains basic document creating classes, dictionary handlers, and the base BD-J document creator.

Com.company.studio.bdj.parser.dom:

This contains fundamental components used by bdj.parser.

Com.company.studio.bdj.patching:

This contains studio-specific flow controls for discs.

Fig. 9(D) - Exemplary Package List

Com.company.studio.bdj.ui:

This contains fundamental interface objects, buttons, texture arrays, fonts, menus, and so on. This also includes certain menu handling objects as well as UI objects, as well as low-level rendering queue handling and the like. This package may also contain the graphics primitives functionality described with respect to element 56 of Fig. 1, although such other UI classes may also contain aspects of this functionality.

Com.company.studio.bdj.ui.component:

This contains interfaces used by ui elements.

Com.company.studio.bdj.ui.layout:

This contains layout managers, e.g., horizontal, vertical, and table.

Com.company.studio.bdj.ui.navigation:

This contains classes related to basic navigation.

Com.company.studio.bdj.util & Com.company.studio.bdj.utility :

These contains basic utility classes, e.g., a dictionary, certain patching items, a popuptimer, and a string utility.

Com.company.studio.bdj.utility.concurrency:

This contains two classes for scheduling events. The abstract class "task" is used to define the behavior for this. The same is used primarily for patching.

Org.w3c.dom:

This related to Coredocument handling.

```
<!--
Settings File
-->
<?xml version="1.0" ?>
 <settings>
<version>1.0</version>
<debug>false</debug>
-<!--
the project number is used in defining the bookmark file name
-->
<project-number>19659</project-number>
-<!--
A=1 B=2 C=4
-->
<region>1,2,4</region>
-<!--
for parental lockout
-->
<parental-level>13</parental-level>
-<!--
first menu is the default menu
-->
<menus>eng,por,spa</menus>
-<!--
in seconds
-->
<popup-menu-timeout>15</popup-menu-timeout>
<button-sound-names>select,activate,activateHold</button-sound-names>
<button-sound-ids>0,1,1</button-sound-ids>
<button-sound-hold>false,false,false</button-sound-hold>
-<!--
          <bdmv-sound-filenames>TU3-1,TU3-2,TU3-3,TU3-4,TU3-5,TU3-6,TU19-1,TU19-2,TU19-
3,TU19-4,TU19-5</bdmv-sound-filenames>
          <bdmv-sound-names>TU3-1,TU3-2,TU3-3,TU3-4,TU3-5,TU3-6,TU19-1,TU19-2,TU19-
3,TU19-4,TU19-5</bdmv-sound-names>
          <bdmv-sound-hold>true,true,true,true,true,true,true,true,true,true,true</bdmv-sound-
hold>

-->
</settings>
```

*EXEMPLARY SETTINGS FILE INCLUDING COUNTRY-SPECIFIC BUSINESS LOGIC*

FRAMEWORK, SYSTEM AND METHOD FOR RAPID DEPLOYMENT OF INTERACTIVE APPLICATIONS

CROSS-REFERENCE TO RELATED APPLICATIONS

This application claims benefit of priority of U.S. Provisional Patent Application No. 61/285,058, filed Dec. 9, 2009, entitled "SYSTEM AND METHOD FOR RAPID DEPLOYMENT OF BLU-RAY DISK INTERACTIVE APPLICATIONS USING JAVA PROGRAMMING LANGUAGE", owned by the assignee of the present invention and herein incorporated by reference in its entirety.

BACKGROUND

Media authoring systems are employed to create media that comply with given standards. For example, a DVD authoring system is used to generate data, such as audio and video data, and to organize this data along with other information used to present and access the data, for placement on a DVD. The organized data are recorded onto a DVD according to standards defined for DVD. Similarly, Blu-ray® authoring systems are used to create optical discs ("BD") storing information according to standards defined by the Blu-ray® Disc Association. BD titles may include applications as well as audiovideo content.

No matter the format, current authoring means for assembling and displaying digital content on various entertainment media are time-consuming and tend to duplicate authoring efforts between creative and engineering components on single projects and also between multiple projects. Current practices of implementing templates and using modularity reduce overall time required but do not eliminate duplicated work.

For example, some systems attempt to simplify the development process by automatically generating BD-J code. These applications go some distance towards reducing or eliminating the need for a Java® programmer. However, many such applications have their own limitations and thus limit the features desired. Other systems and methods, e.g., Blu-ray® authoring systems such as Ensequence on-Q® or Blu-print®, essentially require that a new disc be authored from scratch. While shorcuts exist, e.g., the re-use of file structures or templates, the basic steps remain the same, and the process is time-consuming and duplicative. Even more, significant investments in time are required by engineers to create the new disc, even though most new aspects for each new disc are creative in nature, not technical.

SUMMARY OF THE INVENTION

One implementation of the invention is in the context of interactive application development for media, e.g., Blu-ray® media, and in part takes advantage of the characteristic that the business logic of these applications is often similar, even if the presentation is different. In addition, implementations may take advantage of common constraints on the user interface due to the nature of the content and supporting media, e.g., constraints on what may be displayed and accessed by Blu-ray® media.

Implementations of the invention provide a framework, e.g., a Java®-based toolkit, that provides various levels of abstraction according to the needs of the designer. The abstraction levels are each associated with a set of packages that provide functionality suitable to the level. A user or designer accesses the level packages within the framework and employs the same to create a desired computer-readable media, e.g., a Blu-ray® disc or "BD".

Other aspects of the invention may provide corresponding or complementary functionality. For example, the framework abstracts drawing or graphics primitives to higher-level entities, allowing the same to be easily employed in the creation of arbitrary graphical elements. In another example, a business logic module may be employed which can be customized by using settings files.

In one aspect, the invention is directed to a computing system configured in part as a framework for creating interactive media applications or audiovideo content, the computing system including at least one processor, and the framework for execution by the computing system. The computing system is configured to: execute computer program instructions to provide a framework, the framework including at least two levels, each level including at least one package defining at least one class which may be employed in the creation of an interactive media application or audiovideo content; execute computer program instructions to receive a user-defined specification, the user-defined specification having defined functionality and corresponding to an interactive media application or audiovideo content or both and the user-defined specification causing the instantiation of at least one object from the defined class when the interactive media application or audiovideo content is run; and execute computer program instructions to create a computer-readable disc or disc image, the computer-readable disc or disc image including a tangible copy of the interactive media application or audiovideo content, the interactive media application or audiovideo content embodying the functionality called for in the user-defined specification.

Implementations of the invention may include one or more of the following. The interactive media application or audiovideo content may be a BD-J application or Blu-ray® content, respectively. The framework may include at least three abstraction levels of packages: a first abstraction level provides default packages including project-specific classes; a second abstraction level provides sub-packages; and a third abstraction level provides generic support packages. The framework may also include at least a fourth abstraction level of packages, where the fourth abstraction level provides for deeper levels of abstraction. In particular, the fourth abstraction level provides for at least two deeper levels of abstraction, a baseline code level and a level for fundamental low-level functions. The second abstraction level may include packages applicable to at least two projects. The third abstraction level may include packages that include navigation and user interface functionality. The computer program instructions to receive a user-defined specification may include computer program instructions that instantiate a user-interface application. The disc image may include a BDMV directory with an index file, the index file corresponding to the organization of the disc whereby the interactive application or audiovideo content is embodied. The computer program instructions to receive a user-defined specification include computer program instructions that instantiate a library of graphics primitives configured such that an author may build graphical elements from the primitives. The disc image may include a settings file, and modification of the settings file allows the disc to be set to different business logical schemes.

In another aspect, the invention is directed to a method of creating a computer-readable disc or disc image embodying functionality called for by a user-defined specification. The method includes: providing a framework, the framework including at least one package which may be employed in an interactive media application or audiovideo content, the package defining at least one class; providing a user interface; receiving a user-defined specification from the user interface; and creating a computer-readable disc or disc image, the computer-readable disc or disc image a tangible form of the interactive media application or audiovideo content, the interactive media application or audiovideo content embodying the functionality called for in the user-defined specification, the interactive media application or audiovideo content causing the instantiation of at least one object from the class. In an implementation, the invention is directed to a computer-readable medium, including instructions for causing a computing system to implement the above method.

In another aspect, the invention is directed to a computing system configured to create a computer-readable disc or disc image embodying functionality called for by a user-defined specification. The computing system includes: a processor; memory in communication with the processor bearing computer-readable instructions capable of instantiating a user interface for creating and editing an interactive media application or audiovideo content; memory in communication with the processor bearing computer-readable instructions capable of defining at least one package which may be employed in the creating, the package defining at least one class; and memory in communication with the processor capable of creating a computer-readable disc or disc image, the computer-readable disc or disc image including the interactive media application or audiovideo content.

In one implemention, the invention may further include a recordable media device capable of recording the disc image onto a computer-readable medium in an appropriate format to be interpreted and played back by a media player.

In another aspect, the invention is directed to a computing system configured to create a disc image embodying functionality called for by a user-defined specification. The computing system includes: an input module, the input module for creating an environment for creating and editing an interactive media application or audiovideo content, the input module referencing at least one package of instantiable classes; an output module, the output module for creating a computer-readable disc or disc image, the computer-readable disc or disc image including the interactive media application or audiovideo content, the interactive media application or audiovideo content capable of causing the instantiation of at least one object from the package of instantiable classes.

Implementations of the invention may include one or more of the following. The computing system may further include a recording module, the recording module for creating a disc based on the disc image, the disc playable in a media player. The input module may further include a library of graphics primitives configured such that an author may build graphical elements from the primitives. The disc may further include a settings file, and modification of the settings file allows the disc to be set to different business logical schemes.

Advantages may include one or more of the following. Applications or other menu-driven media with custom user interface designs can be developed with minimal programming, e.g., with minimal use of Java®. The same with template-based user interface designs may be developed without any programming. Other advantages will be apparent from the description that follows, including the figures and claims.

BRIEF DESCRIPTION OF THE DRAWINGS

Like reference numerals denote like elements throughout.

FIGS. 9(A)-9(D) are exemplary descriptions of the packages within FIG. 8. One of ordinary skill in the art will recognize that different packages may be employed in various implementations, as well as different levels. These packages are in some cases specific to Blu-ray® Disc Java® implementations: other scenarios and situations may require different packages.

FIG. 10 is an exemplary settings file, illustrating the implementation of business-specific logic.

DETAILED DESCRIPTION

Figure 1:
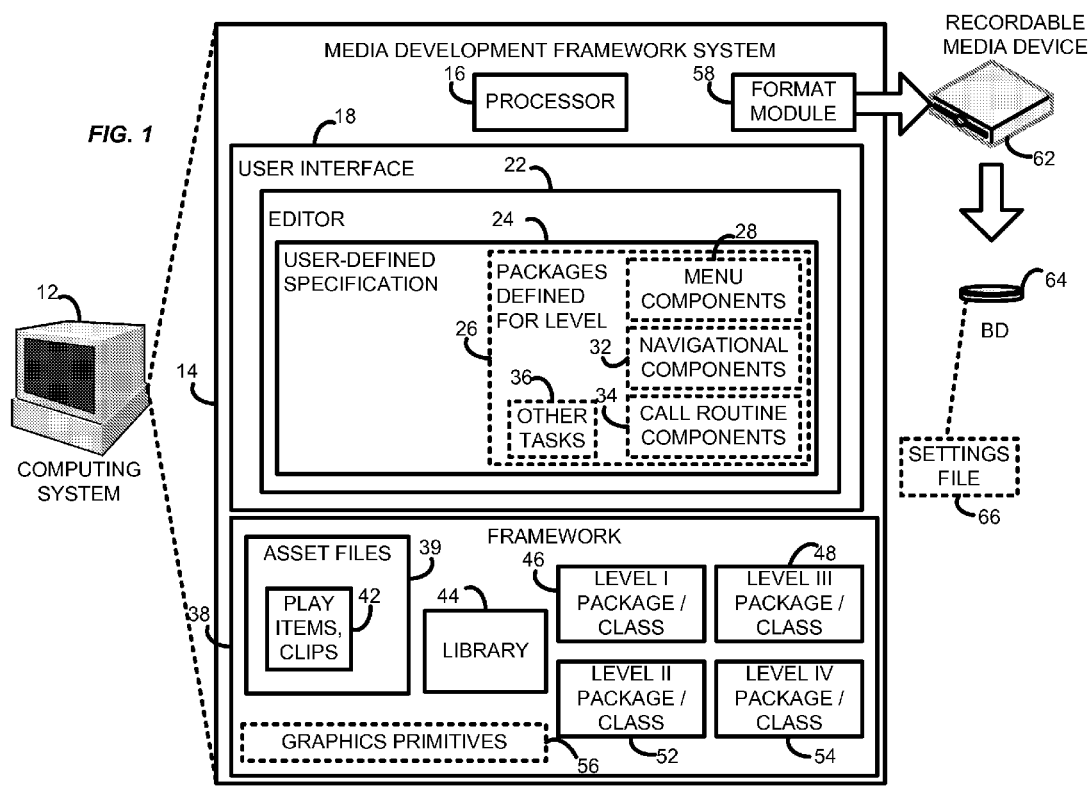
FIG. 1 illustrates a schematic depiction of a media development framework system as implemented in a computing system.

Referring to FIG. 1, a computing system 12 is illustrated that implements a media development framework system 14. Using the media development framework system 14, media, e.g., a BD, may be authored having desired properties. The media development framework system 14 includes a processor 16 and other components as will be described, and may implement a user interface 18 through which a user may author a computer-readable medium. The user interface 18 may include an editor 22, and the editor 22 may range from simple to complex, depending on the skill level and needs of the user. Using the editor 22, a user may author media so as to implement a user-defined specification 24. In so doing, a user may employ a set of packages 26 defined for various levels. For example, a user-defined specification 24 may call for certain items to be placed on menus on a recordable media. In particular, the user-defined specification 24 may call for movies and slideshows to be recorded on an optical disc such that a user may play back the same via activating elements on menus.

Depending on what is demanded by the user-defined specification 24, one or more packages 26 may be employed. These packages 26 are defined at various levels, users may choose which level packages to employ, and a user may employ packages from more than one level in a given application. The choice may be made dependent upon the level of detail at which the user must work to implement the user-defined specification 24. While the packages are described in greater detail below, it is noted that the same may be considered to include menu components 28, navigational components 32, call routine components 34, and a set of components 36 for other tasks.

To meet the requirements of a given user-defined specification 24, a framework 38 is employed. The framework 38 includes a package 46 of classes for level I, a package 52 of classes for level II, a package 48 of classes for level III, and a package 54 of classes for level IV. A library 44 may be provided for other classes or needed elements. A set of asset files 39 is also provided, these including, e.g., play items and clips such as audio and video files for display and for use in the interactive application or audiovideo content. A library of graphics primitives 56 is also provided, as are explained in greater detail below, for purposes of creating and implementing arbitrary user interface elements within the interactive application or audiovideo content. The graphics primitives functionality may be located in one or more of the user interface classes or layout within the levels.

Once the user-defined specification 24 has been implemented using the framework 38, a disc image may be created and stored. In creating the disc image, a format module 58 may be employed to provide any necessary data formatting and conversion. The disc image, which may be output from the format module 58, may then be stored on a computer-readable medium 64, such as by using a recordable media device 62. The computer-readable medium 64 may include a settings file 66, described in greater detail below.

Figure 2:
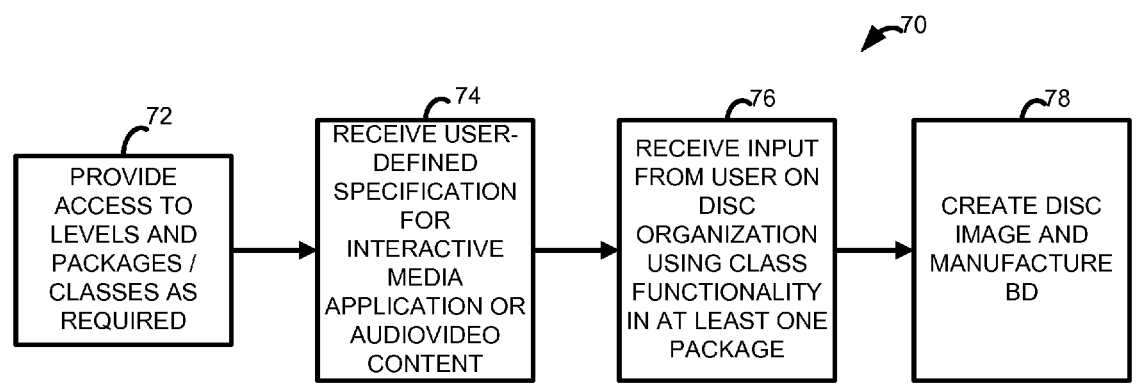
FIG. 2 is a flowchart of one implementation of the described method. In this implementation, a computer-readable medium such as a BD is created using a framework. The framework provides packages of classes in various levels, and one or more levels may be accessed according to the needs of the user.

Referring to FIG. 2, a flowchart 70 of an implementation of the method is illustrated. A first step is to provide access (step 72) to levels and packages, as well as the indwelling classes, as required by the levels. For example, elements may be provided on the user interface 18 corresponding to the levels that, when activated, bring up a set of packages appropriate to and available in the level. In the same way, elements may be provided on the user interface 18 corresponding to the packages that, when activated, bring up a set of classes available in the level. The author then chooses and implements the classes corresponding to the functionality desired. When the final interactive media application is run, as provided on the computer-readable medium, objects are instantiated corresponding to those classes.

A next step is that the system receives a user-defined specification for an interactive media application or for audiovideo content (step 74). This reception of a user-defined specification may range from the simple to the complex. For example, this step may be met by a user indicating via the editor which asset files are to be included on the computer-readable medium, as well as how they are to be organized. The user may indicate one or more video files to be included on the media. The user-defined specification will typically include not only video files, but also special features such as commentaries and other presentations ancillary to a main feature. In the case of BD-J media, interactive applications and features employing online resources may also be included. The provision of any or all of these may constitute the reception of a user-defined specification for an interactive media application. Moreover, the reception of a user-defined specification may also be the loading into memory of a file containing information about a prior-defined specification. In many cases, the reception may be a combination of a previously written specification and contemporaneous user modification to fit the needs of a current project.

A next step is to receive input from the user on the organization of the media, where the organization, layout, and usage employ functionality corresponding to at least one package (step 76). In this way, the user creates the organization of the interactive media application or audiovideo content that will be implemented as a computer-readable medium. The interactive media application may be a BD-J application, a video clip, a slideshow, an audio presentation, or the like. The organization, layout, and usage of the interactive media application may correspond to the menu functionality and associated components, the navigational features and their components as provided, and the called routine components, including those employed to access external online resources, if any.

A final step is to create the disc image, e.g., a master disc image, and manufacture the computer-readable medium (step 78). In some cases the computer-readable medium may be created in the absence of a step of creating a disc image. In FIG. 2, however, a disc image is created and a Blu-ray® disc is manufactured.

Figure 3:
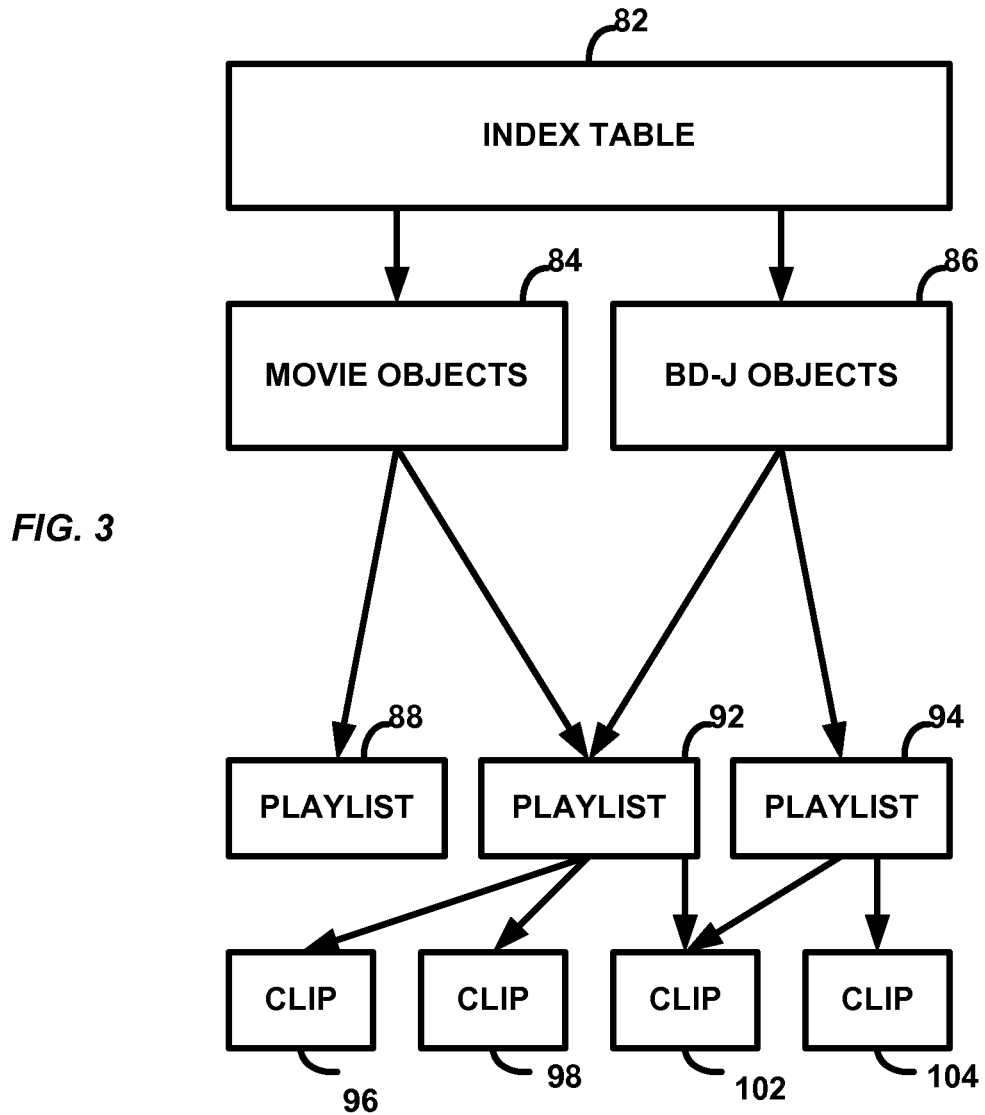
FIG. 3 illustrates the organization of files in a BD.

FIG. 3 illustrates a structure of an exemplary computer-readable medium, e.g., a BD. An index table 82 provides a starting point and may be thought of as being at the highest level of the disc. Generally, the index table 82 lists and in some cases can reference one or more movie objects 84 and one or more BD-J objects (BDJOs) 86. The set of movie objects 84 refers to HDMV objects which run in the execution environment of the HDMV mode. Similarly, the set of BDJOs 86 refer to BDJOs that run in the procedural environment of the BD-J mode. The movie objects 84 and BD-J objects 86 can each perform a number of functions, including launching playlists 88, 92, and 94, which in turn include and run one or more play items or clips 96, 98, 102, or 104.

Figure 4:
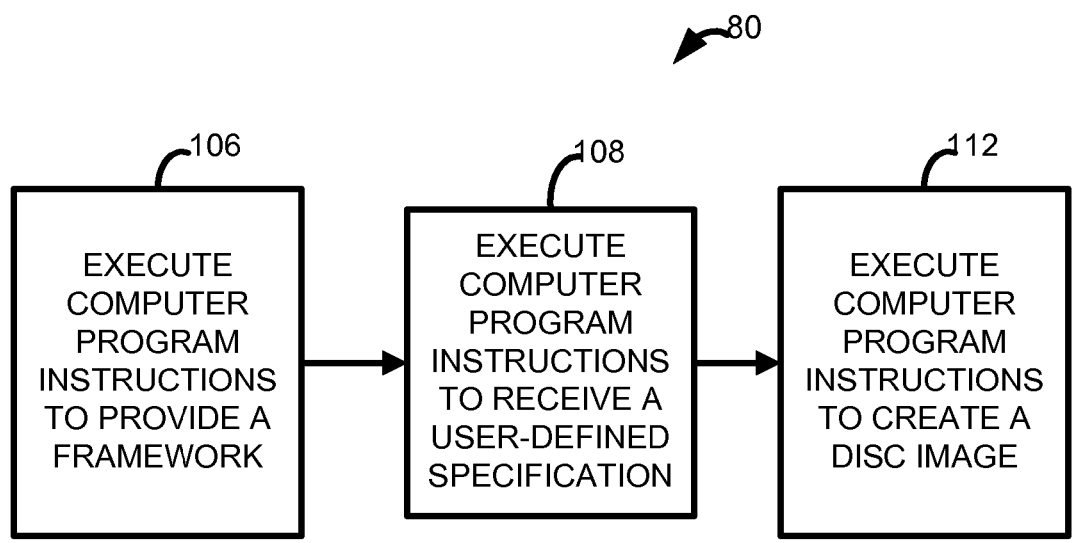
FIG. 4 is a flowchart of another implementation of the described method.

Referring to FIG. 4, steps are shown on flowchart 80 for another method of implementing a user-defined specification in the creation of an interactive media application or audiovideo content. A first step is to execute computer program instructions to provide a framework (step 106). This step may be performed by the computing system, a workstation, or any other such authoring system configured as a tool for creating the application or video media. The framework is as described above, including the provision of at least two levels of packages, the packages defining classes for use in creation of the interactive media application or media. In the implementation described here, four levels of packages are provided. However, this number is exemplary and more or less levels may be provided in any given implementation. In the current exemplary implementation, four levels is convenient as the same allow levels that are project-specific, studio-specific, a level generic to multiple studios, and a level generic to all BD-J applications.

A next step is to execute computer program instructions to receive a user-defined specification (step 108). This step involves receiving various commands and inputs from the user regarding the user-defined specification. These commands and inputs may be minimal in the case where the user-defined specification is minimal, e.g., where the interactive media application is simple or where the project is complex but re-uses a significant number of components from a prior similar project. For example, in a series of media, e.g., several BDs containing episodes of a season of a television series, it may be desirable for the BDs to have a consistent appearance, varying little besides portraying thumbnails of different episodes. In this case, the author may only need to change certain parameters at a level corresponding to the given episodes. The user need not change parameters corresponding to the given television season, because such parameters would apply to all discs in the season. Nor would the user be required to change parameters corresponding to the given television series, because such parameters would again be consistent across all discs. It may further be that there are parameters that do not have to change, even above the series level, because the studio may desire some degree of consistency across all shows it generates.

Of course, the user-defined specification may also be as complex as desired and as called for by the project. The same may be entered and edited by an editor 24 which forms a portion of a user interface 18 as described above.

A next step is to execute computer program instructions to create a disc image (step 112). Prior to this step, the user has entered that which is necessary to define the interactive media application or video media, which may be, e.g., a Blu-ray® title. The same may then be employed, undergoing any necessary formatting or conversion, to create a disc image, e.g., a master disc image for use in creating and manufacturing computer-readable media embodying the interactive media application.

Figure 5:
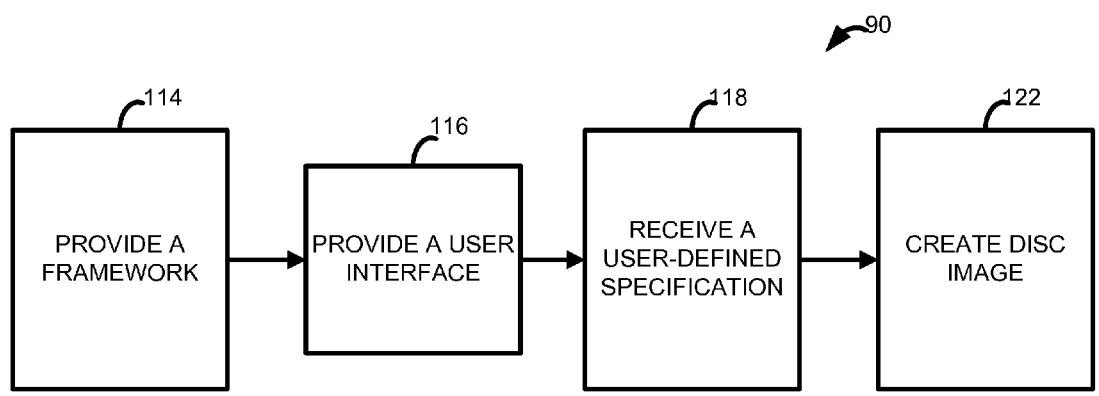
FIG. 5 is a flowchart of yet another implementation of the described method.

While FIG. 4 illustrates instructions executed by the computing system in authoring an interactive media application or video media, FIG. 5 illustrates a flowchart 90 of the steps themselves. The actions, however, are similar and certain aspects of the description will not be repeated.

A first step is to provide a framework as described above (step 114). A next step is to provide a user interface (step 116). A next step is to receive a user-defined specification (step 118). In this connection it is noted that this step encompasses all aspects of the user input as noted above. Consequently, once this step is finished, the user has completed the design and organization of the interactive media application or audiovideo content, and also has designated which asset files are to be included on the media. The next step is then to create a disc image (step 122).

Figure 6:
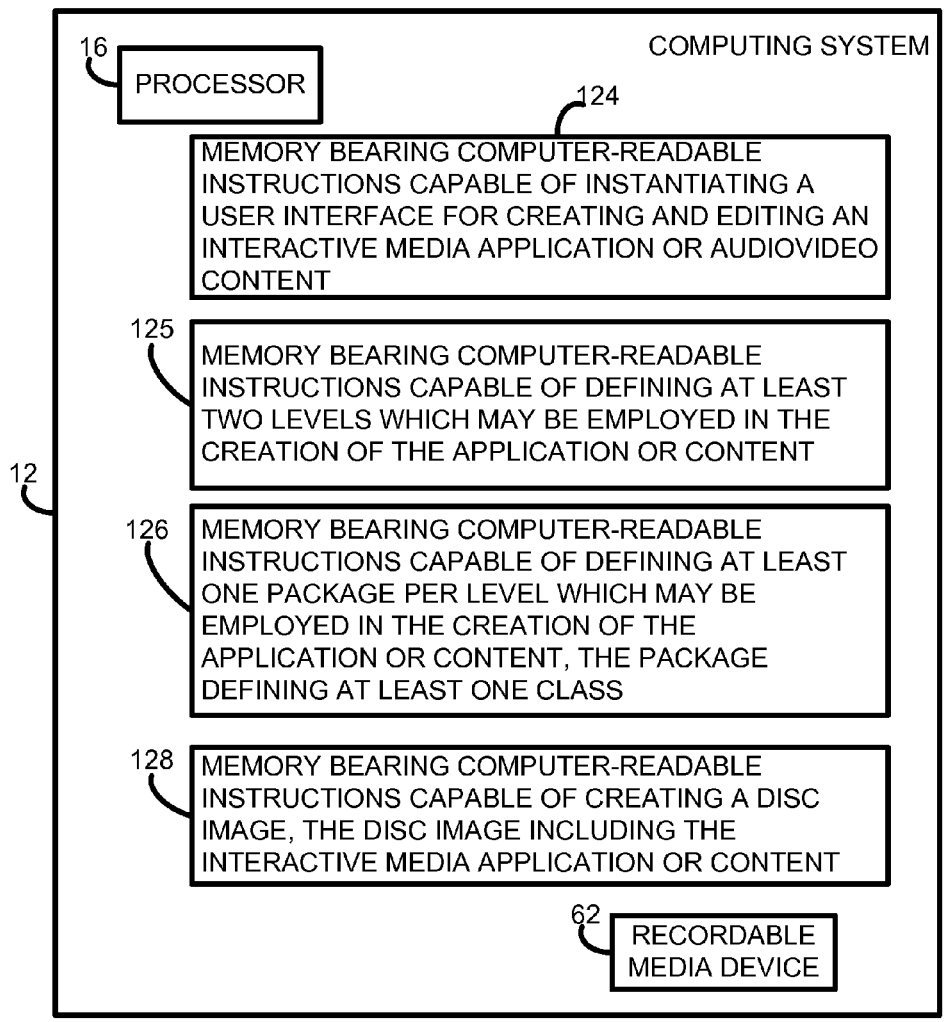
FIG. 6 illustrates a schematic of another implementation of a media development framework system.

Referring to FIG. 6, a computing system 12 is shown that may implement the invention. The computing system 12 includes the processor 16, as has been described above. The computing system 12 also includes the recordable media device 62, capable of creating suitable computer-readable media. The computing system 12 further includes memory 124 bearing computer-readable instructions capable of instantiating a user interface for creating and editing an interactive media application or audiovideo content, or both for use in any given title. The computing system 12 further includes memory 125 bearing computer-readable instructions capable of defining at least two levels of packages, each level capable of being employed in the creation of the application or content. The computing system 12 further includes memory 126 bearing computer-readable instructions capable of defining at least one package within each of the at least two levels, which may be employed in the creation of the application or title, the package defining at least one class. In addition, the computing system 12 includes memory 128 bearing computer-readable instructions capable of creating a disc image, the disc image including and embodying the interactive media application or audiovideo title. The memories 124, 125, 126, and 128 typically constitute various types of dynamic random access memories in which their respective instructions are loaded at the time of operating the framework. However, as is known, such memories may also include disc storage, caches, or other temporary locations in which data may be stored or operated on.

Figure 7:
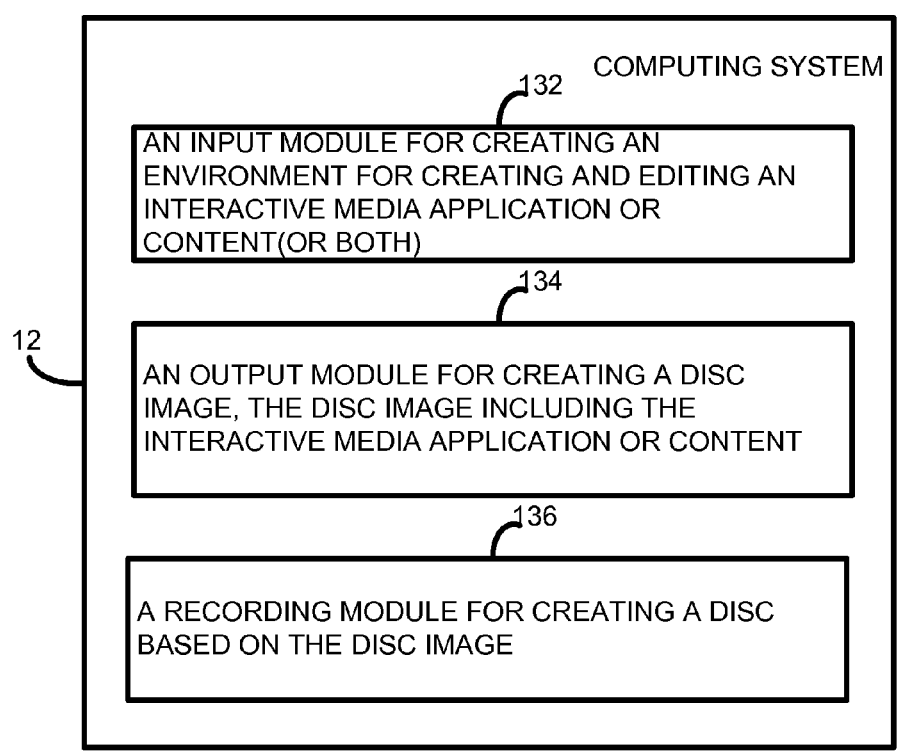
FIG. 7 illustrates a schematic of yet another implementation of a media development framework system.

Referring to FIG. 7, the computing system 12 is shown in another way. In particular, the computing system 12 includes an input module 132 for creating an environment for creating and editing an interactive media application or audiovideo content or both. The computing system 12 further includes an output module 134 for creating a disc image, the disc image including the interactive media application or audiovideo content. The computing system 12 may further include a recording module 136 for creating a disc based on the disc image.

Figure 8:
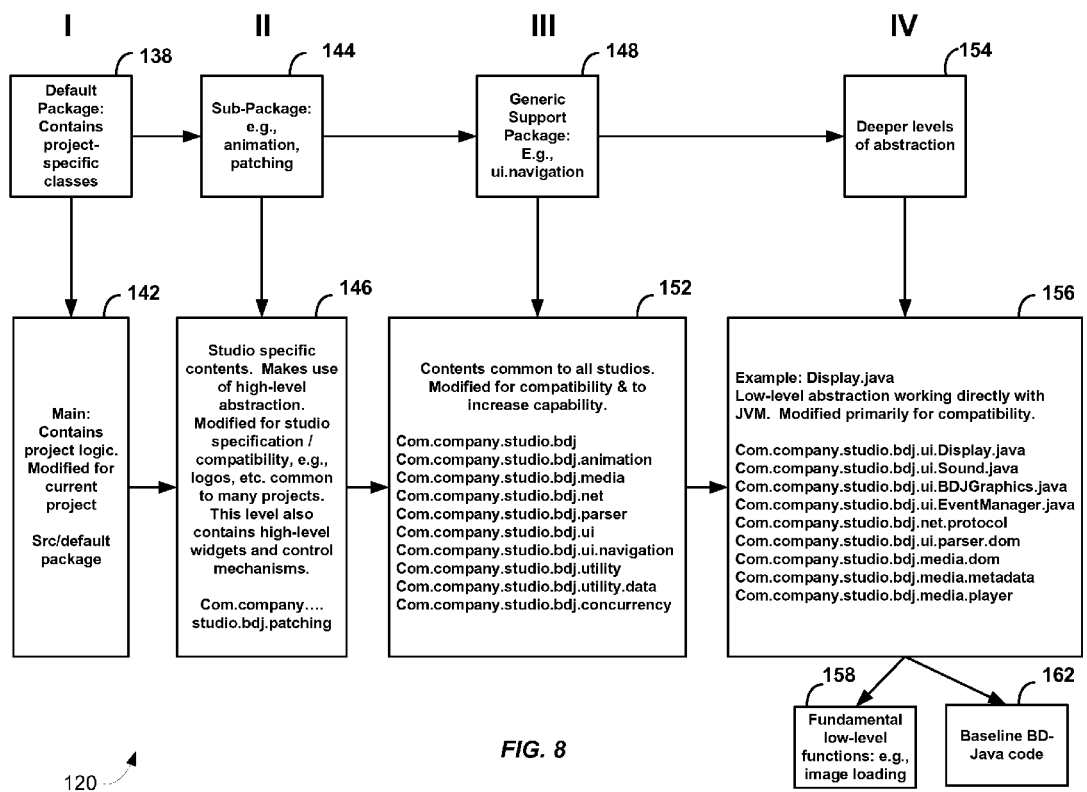
FIG. 8 illustrates an exemplary structure of the framework, showing exemplary levels and exemplary packages of classes that pertain to the different levels.

FIG. 8 indicates an exemplary package abstraction structure showing levels I-IV. Certain of the below indicated packages are described in the Appendix, which is provided as FIGS. 9(A)-(D).

Level I is a default package 138. Level I represents the highest level of abstraction, e.g., the project level and the basic logic pertinent to projects, and project-level customization occurs at this level. For example, a content workflow may be described at this level. Accordingly, the package 138 contains various project-specific classes as indicated in box 142. In many cases, a project worked on within level I will be based on a prior project, and simply modified to meet current needs.

A level II package 144, also termed a sub-package, represents a studio-specific abstraction level. This level generally includes functionality unique to a studio, and the same may span many projects. For example, for consistent branding, a studio may desire that a logo appear in the same place on all menus, or that all menus include a common number of buttons. The packages at this level may be used to meet such studio-specific needs. As with all levels, some customization may occur; for example, the usual number of buttons may be split across two screens if dictated by a particular project. This package may also make use of certain higher-level abstractions, but the same may generally be at a lower level than the level I package. Exemplary level II packages are shown in box 152.

The level III package 148 represents generic support functionality such as navigational buttons, widgets, or the like. In many cases, these may be the lowest level that need be accessed for most projects using the disclosed systems and methods. The contents of the level III package are illustrated in box 152 and may includes classes that are common to most studios, including those pertaining to animation, media, and navigation.

The level IV package 154 generally provides for deeper levels of abstraction, and in generally need not be accessed for most projects. These deeper abstraction levels may include, e.g., the ability to work directly with JVM. Modifications at this level are often performed for reasons of compatibility. Examples of classes at this level of abstraction are illustrated in the figure. The level IV package 154 may in some cases be thought of as including two sublevels. One sub-level 158 is to handle fundamental low-level functions, such as the loading of images. Another sub-level 162 is the level of the baseline BD-Java® code.

At Levels I and II, which represent the 'project' and 'studio' levels, respectively, complexity is minimized. In contrast, and at the other extreme, level IV is the most complex, and authoring at this level take place at the level of engineered coding. Prior authoring generally occurred using classes that may be found in such a Level IV.

Packages represent one or more classes, which may constitute blocks of code, the code corresponding to groups of applications, single applications, mini-application routines, or the like. Each class may generally be instantiated as objects when an interactive media application or audiovideo title is run. In some cases, custom code may be written in a given circumstance to couple or connect two packages together to provide corresponding custom functionality.

An advantage to having the level abstractions of the system and method is that the same allows any such problems that occur in a package to be fixed once for all. That is, in an authoring process, problems or errors generally arise at one of the four levels I-IV. Any solutions to such problems propagate to other uses of the package, eliminating the need to fix the same problem again in a later project.

Implementations of the invention may also include use of a "settings" file. FIG. 10 illustrates an exemplary such "settings" file. The same includes specific business logic in order to allow country—specific features and aspects to be conveniently enabled. That is, the engineer need only write one such settings file, with this functionality, and then simple modifications allow one country to be specified versus another. For example, a Blu-ray® disc sold in Japan may be structured in a different way than the same disc sold in North America, e.g., in terms of the mapping of the playlist, the sequence of the playlist, the copyright warning, and so on. These changes may be conveniently reflected and modified via the settings file. In the same way, a designer may add a trailer in a simplified way by again simply editing the settings file, requiring no or a minimum of programming skill. Similarly, a parental lockout level may be set using this file to disable access to certain content depending on the setting of the player. The settings file may be generally loaded concurrently with the loading of the BD-J Java Archive or JAR.

Figure 11:
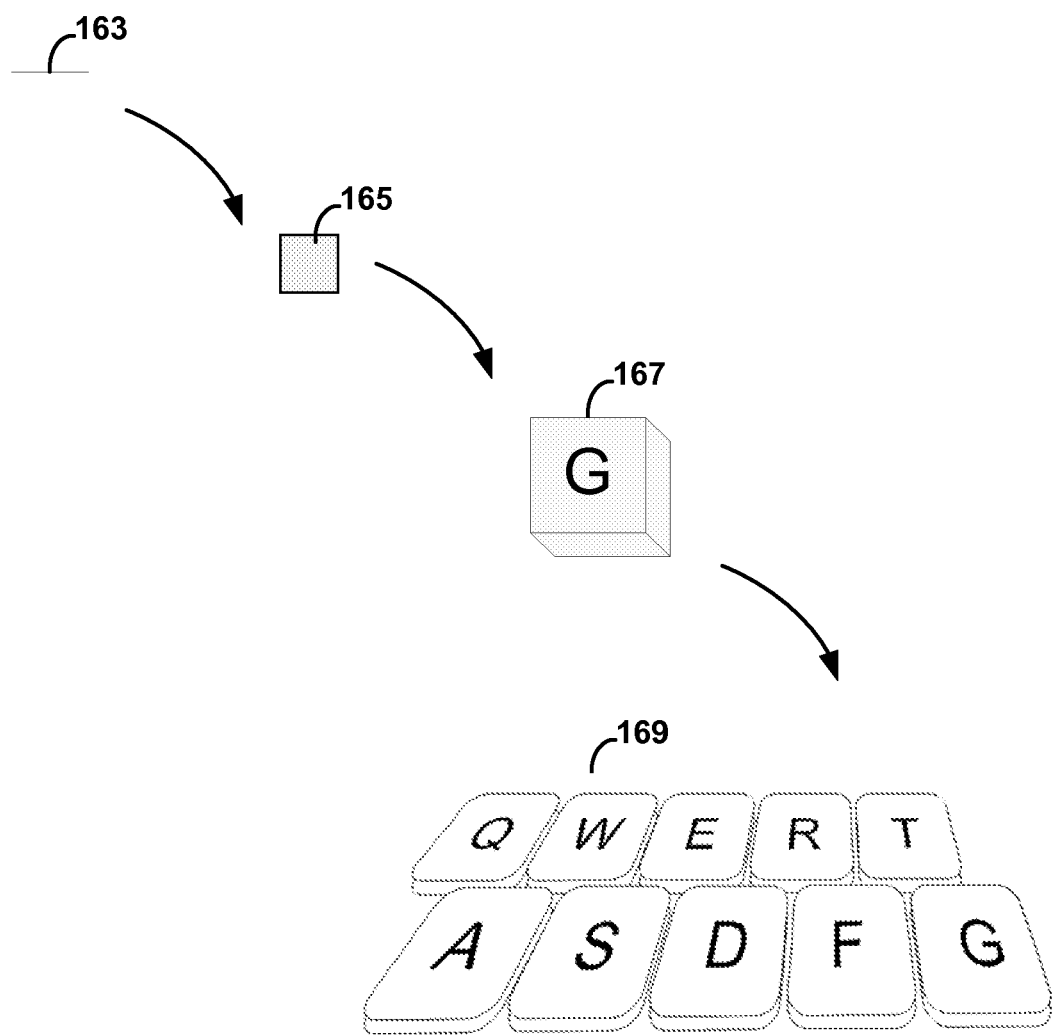
FIG. 11 illustrates the construction of arbitrary graphical elements from elemental graphics primitives.

Implementations of the invention may also provide a way to create arbitrary graphics elements by use of combinations of graphics primitives. In particular, FIG. 11 illustrates how graphics abstractions may be employed at a primitive level in order to allow a designer to create a desired image to be displayed, e.g., a drawing API. The graphics primitives may be employed as building blocks to create complicated images and to define relationships between objects, and in this way to create animations. As an example of using these graphics primitives to build needed objects, a simple case may be a single drawn line 163, as illustrated in FIG. 11. The single drawn line 163 may be repeated and modified with a simple texture to build a simple block 165, which is a simple drawn texture. With appropriate modifications and embellishments, the simple building block 165 can be used to create a button, illustrated in FIG. 11 as a "G" button 167. The button 167 is not just a graphic image but also embodies functionality; upon clicking or activation, an action may be caused to occur. Once the button 167 is built, the same may be used and repeated to build a simple virtual keyboard 169. The keyboard 169 is an even-more-complex case, and is composed of a combination of buttons, each with functionality. Another important related abstraction concept is a provision for building playlists. That is, implementations are not just limited to building complicated and functional graphics elements from graphics primitives, but also the ability to define for playback a sequence of videos or to otherwise manage presentations. Using such aspects, functionality may be enabled such as picture-in-picture, simple menus, or the like. A wide variety of use cases may be achieved in a short time using the framework. For example, such functionality may be employed to create quizzes or other games in any number of presentation formats.

For picture-in-picture applications, the framework allows significantly enhanced flexibility and functionality. For example, if a user disables the picture-in-picture function and then re-enables the same, the display can start from the prior ending point, or at the beginning, or at another arbitrary location. This can be especially useful with picture-in-picture displays in which slides are displayed and where the same are interspliced with commentary, drawings, or other artwork. Further in the BD-J context, if the picture-in-picture display is undesiredly small, the same may be enlarged via use of BD-J graphics capabilities. More generally, the framework can be used to allow control via varying logical schemes.

Systems and methods have been disclosed that allow the rapid development, e.g., in Java®, of applications with custom UI design. Moreover, applications with template UI can be developed without Java® programming of any kind. While the invention has been described in the context of creating Blu-ray® discs employing BD-J, implementations of the framework may be used for creating any type of application or video title on any type of media.

Figure 12:
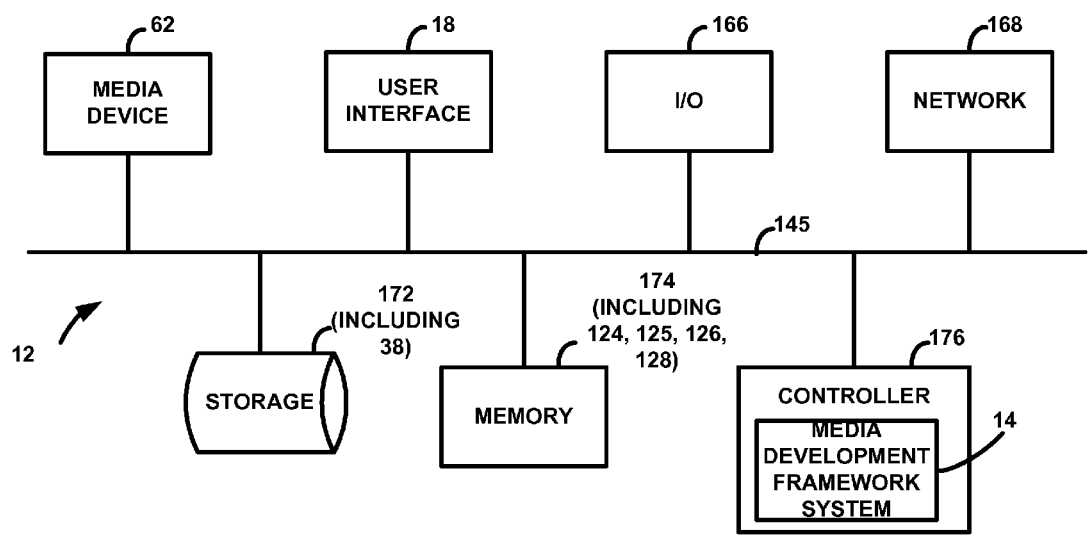
FIG. 12 illustrates an exemplary computing environment, e.g., that of the disclosed authoring system.

One implementation includes one or more programmable processors and corresponding computing system components to store and execute computer instructions, such as to execute the code that provides the framework functionality. Referring to FIG. 12, a representation of an exemplary computing environment is illustrated, e.g., a workstation 12. A user can employ the workstation 12 to author a computer-readable medium 64 by executing an authoring system 14 which receives data as an input and outputs a disc image or a computer-readable medium such as a BD.

The workstation 12 includes a controller 176, a memory 174, storage 172, the media device 62, the user interface 18, an input/output (I/O) interface 166, and a network interface 168. The components are interconnected by a common bus 145. Alternatively, different connection configurations can be used, such as a star pattern with the controller at the center.

The controller 176 includes the programmable processor and controls the operation of the workstation 12 and its components. The controller 176 loads instructions from the memory 174 or an embedded controller memory (not shown) and executes these instructions to control the system. In its execution, the controller 176 may provide the framework system 14 as, in part, a software system. Alternatively, this service can be implemented as separate modular components in the controller 176 or the workstation 12.

Memory 174 stores data temporarily for use by the other components of the workstation 12, and the same may include memories 124, 125, 126, and 128 discussed above. In one implementation, memory 174 is implemented as RAM. In other implementations, memory 174 also includes long-term or permanent memory, such as flash memory and/or ROM.

Storage 172 stores data temporarily or long-term for use by other components of the workstation 12, such as for storing data used by the framework system 14. In one implementation, storage 172 is a hard disc drive or a solid state drive. Storage 172 may include the framework noted above from which the user may draw upon levels of packages for use in authoring.

The media device 62 receives removable media and reads and/or writes data to the inserted media. In one implementation, the media device 62 is an optical disc drive or disc burner, e.g., a writable Blu-ray® disc drive.

The user interface 18 includes components for accepting user input, e.g., the user-defined specification, from the user of the workstation 12 and presenting information to the user. In one implementation, the user interface 18 includes a keyboard, a mouse, audio speakers, and a display. The controller 176 uses input from the user to adjust the operation of the workstation 12.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices.

The network interface 168 includes a wired and/or wireless network connection, such as an RJ-45 or "WiFi" interface (802.11) supporting an Ethernet connection. Numerous other types of network connections will be understood to be possible, including WiMax, 3G or 4G, 802.15 protocols, 802.16 protocols, satellite, Bluetooth®, or the like.

The workstation 12 includes additional hardware and software typical of workstations, e.g., power, cooling, and operating system, though these components are not specifically shown in the figure for simplicity. In other implementations, different configurations of the workstation can be used, e.g., different bus or storage configurations or a multi-processor configuration.

Various illustrative implementations of the present invention have been described. However, one of ordinary skill in the art will recognize that additional implementations are also possible and within the scope of the present invention. For example, while the packages are distinct, if needed, custom code may be employed to connect these packages in ways desired by the designer. Moreover, it is noted that if a subcategory has no contents, then the same may be truncated. For example, if there are no studio-specific contents, then the abstraction level may be moved up. In addition, although the authoring system has been described in terms of the BD format, the system can be used to author discs or media in formats other than in the BD format. Similarly, the system can be employed in the context of a Blu-ray® platform technology, where Blu-ray® technology is employed but where the source or target of files is not a BD. In this case, delivery of content may be by way of a delivery mechanism such as the internet or other network, rather than via BD. Other delivery mechanisms will also be understood. While the use of a disk image has been discussed, it will be understood that certain recording methods do not require use of a disc image to create a disc such as a BD. While audiovideo content has been discussed, the same applies to content that embodies just audio data or just video data. Accordingly, the systems and methods may apply to any techniques used to create computer-readable media.

Accordingly, the present invention is not limited to only those implementations described above.

The invention claimed is:

1. A computing system including a hardware-implemented controller and non-transitory computer-readable storage media, the computing system configured in part as a framework for creating programmed functionalities in interactive media applications or audiovideo content that execute on a virtual machine, the computing system configured to:
  a. execute computer program instructions stored in the non-transitory computer-readable storage media to provide a framework having a user interface, the framework including a hierarchically-arranged plurality of levels, each level including at least one package defining at least one class which may be employed in the creation of the programmed functionalities, the plurality of levels providing respective varying degrees of abstraction from high-level abstraction to low-level abstraction, a lower level hiding implementation details of a given programmed functionality from a higher level, the degree of abstraction exposed by the framework to a framework user being user-selectable through the user interface,
    a highest level of abstraction exposing programmable functionality through the user interface according to user-selection, the exposed functionality at the highest level being uniquely associated with a specific interactive media application or audiovideo content,
    at least one intermediate level of abstraction exposing functionality through the user interface according to user-selection, the exposed functionality at the at least one intermediate level either i) being common to a plurality of related interactive media applications or audiovideo content or ii) providing generic support for unrelated interactive media applications or audiovideo content, and
    a lowest level of abstraction exposing functionality through the user interface according to user-selection, the exposed functionality at the lowest level enabling direct manipulation of operation of the virtual machine;
  b. execute computer program instructions stored in the non-transitory computer-readable storage media to receive a user-defined specification, the user-defined specification having defined functionality and corresponding to an interactive media application or audiovideo content or both and the user-defined specification causing the instantiation of at least one object from the defined class when the interactive media application or audiovideo content is run; and
  c. execute computer program instructions stored in the non-transitory computer-readable storage media to create a computer-readable disc or disc image, the computer-readable disc or disc image including a tangible copy of the interactive media application or audiovideo content, the interactive media application or audiovideo content embodying the functionality called for in the user-defined specification.

2. The computing system of claim 1, wherein the interactive media application or audiovideo content is a BD-J application or Blu-ray® content, respectively.

3. The computing system of claim 1, wherein the framework includes at least three abstraction levels of packages, and wherein a first abstraction level provides default packages including project-specific classes, a second abstraction level provides sub-packages, and a third abstraction level provides generic support packages.

4. The computing system of claim 3, wherein the framework includes at least a fourth abstraction level of packages, and wherein the fourth abstraction level provides for deeper levels of abstraction.

5. The computing system of claim 4, wherein the fourth abstraction level provides for at least two deeper levels of abstraction, a baseline code level and a level for fundamental low-level functions.

6. The computing system of claim 3, wherein the second abstraction level includes packages applicable to at least two projects.

7. The computing system of claim 3, wherein the third abstraction level includes packages that include navigation and user interface functionality.

8. The computing system of claim 1, wherein the computer program instructions to receive a user-defined specification include computer program instructions that instantiate a user-interface application.

9. The computing system of claim 1, wherein the disc image includes a BDMV directory with an index file, the index file corresponding to the organization of the disc whereby the interactive application or audiovideo content is embodied.

10. The computing system of claim 1, wherein the computer program instructions to receive a user-defined specification include computer program instructions that instantiate a library of graphics primitives configured such that an author may build graphical elements from the primitives.

11. The computing system of claim 1, wherein the disc image includes a settings file, and where modification of the settings file allows the disc to be set to different business logical schemes.

12. The computing system of claim 1 in which the providing of generic support comprises provision of functionality for animation, media, and navigation.

13. The computing system of claim 1 in which the direct manipulation comprises one of image loading or coding of bytecode.

14. A method of creating a computer-readable disc or disc image embodying programmed functionality called for by a user-defined specification, comprising:
  a. providing a framework, the framework having a user interface, the framework including a hierarchically-arranged plurality of levels, each level including at least one package defining at least one class which may be employed in the creation of the programmed functionalities, the plurality of levels providing respective varying degrees of abstraction from high-level abstraction to low-level abstraction, a lower level hiding implementation details of a given programmed functionality from a higher level, the degree of abstraction exposed by the framework to a framework user being user-selectable through the user interface,
    a highest level of abstraction exposing programmable functionality through the user interface according to user-selection, the exposed functionality at the highest level being uniquely associated with a specific interactive media application or audiovideo content,
    at least one intermediate level of abstraction exposing functionality through the user interface according to user-selection, the exposed functionality at the at least one intermediate level either i) being common to a plurality of related interactive media applications or audiovideo content or ii) providing generic support for unrelated interactive media applications or audiovideo content, and
    a lowest level of abstraction exposing functionality through the user interface according to user-selection, the exposed functionality at the lowest level enabling direct manipulation of operation of a virtual machine;
  b. providing the user interface having the user-selectable abstraction degree;
  c. receiving a user-defined specification from the user interface; and
  d. creating a computer-readable disc or disc image, the computer-readable disc or disc image a tangible form of the interactive media application or audiovideo content, the interactive media application or audiovideo content executing on a virtual machine and embodying the programmed functionality called for in the user-defined specification, the interactive media application or audiovideo content causing the instantiation of at least one object from the class.

15. A computing system configured to create a computer-readable disc or disc image embodying programmed functionalities called for by a user-defined specification, comprising:
  a. a hardware-implemented controller including a programmable processor;
  b. non-transitory memory in communication with the processor bearing computer-readable instructions capable of instantiating a user interface for creating and editing an interactive media application or audiovideo content that executes on a virtual machine, the user interface being operable on a framework, the framework including a hierarchically-arranged plurality of levels, each level including at least one package defining at least one class which may be employed in the creation of the programmed functionalities, the plurality of levels providing respective varying degrees of abstraction from high-level abstraction to low-level abstraction, a lower level hiding implementation details of a given programmed functionality from a higher level, the degree of abstraction exposed by the framework to a framework user being user-selectable through the user interface,
    a highest level of abstraction exposing programmable functionality through the user interface according to user-selection, the exposed functionality at the highest level being uniquely associated with a specific interactive media application or audiovideo content,
    at least one intermediate level of abstraction exposing functionality through the user interface according to user-selection, the exposed functionality at the at least one intermediate level either i) being common to a plurality of related interactive media applications or audiovideo content or ii) providing generic support for unrelated interactive media applications or audiovideo content, and
    a lowest level of abstraction exposing functionality through the user interface according to user-selection, the exposed functionality at the lowest level enabling direct manipulation of operation of the virtual machine;
  c. non-transitory memory in communication with the processor bearing computer-readable instructions capable of defining the at least one package; and
  d. non-transitory memory in communication with the processor capable of creating a computer-readable disc or disc image, the computer-readable disc or disc image including the interactive media application or audiovideo content.

16. The system of claim 15, further comprising a recording module, the recording module for creating a disc based on the disc image, the disc playable in a media player.

17. The system of claim 15, further comprising a recordable media device capable of recording the disc image onto a computer-readable medium in an appropriate format to be interpreted and played back by a media player.

18. A computing system including a hardware-implemented controller and non-transitory computer-readable storage media, the computing system configured to create a disc image embodying functionality called for by a user-defined specification, comprising:
  a. an input module, the input module for creating a framework for creating and editing an interactive media application or audiovideo content that executes on a virtual machine, the framework having a user interface and including a hierarchically-arranged plurality of levels, each level including at least one package defining at least one class which may be employed in the creation of the programmed functionalities, the plurality of levels providing respective varying degrees of abstraction from high-level abstraction to low-level abstraction, a lower level hiding implementation details of a given programmed functionality from a higher level, the degree of abstraction exposed by the framework to a framework user being user-selectable through the user interface, the input module referencing the at least one package of instantiable classes, code representing the at least one package being stored on the non-transitory computer-readable storage media, a highest level of abstraction exposing programmable functionality through the user interface according to user-selection, the exposed functionality at the highest level being uniquely associated with a specific interactive media application or audiovideo content, at least one intermediate level of abstraction exposing functionality through the user interface according to user-selection, the exposed functionality at the at least one intermediate level either i) being common to a plurality of related interactive media applications or audiovideo content or ii) providing generic support for unrelated interactive media applications or audiovideo content, and a lowest level of abstraction exposing functionality through the user interface according to user-selection, the exposed functionality at the lowest level enabling direct manipulation of operation of the virtual machine; and b. an output module, the output module for creating a non-transitory computer-readable disc or disc image, the computer-readable disc or disc image including the interactive media application or audiovideo content, the interactive media application or audiovideo content capable of causing the instantiation of at least one object from the package of instantiable classes.

19. The system of claim 18, further comprising a recording module, the recording module for creating a disc based on the disc image, the disc playable in a media player.

20. The system of claim 18, wherein the input module includes a library of graphics primitives configured such that an author may build graphical elements from the primitives.

21. The system of claim 18, wherein the disc includes a settings file, modification of the settings file allowing the disc to be set to different business logical schemes.

* * * * *